March 6, 1956 A. R. RUSSELL 2,737,060
STEERING DEVICES
Filed Dec. 28, 1954
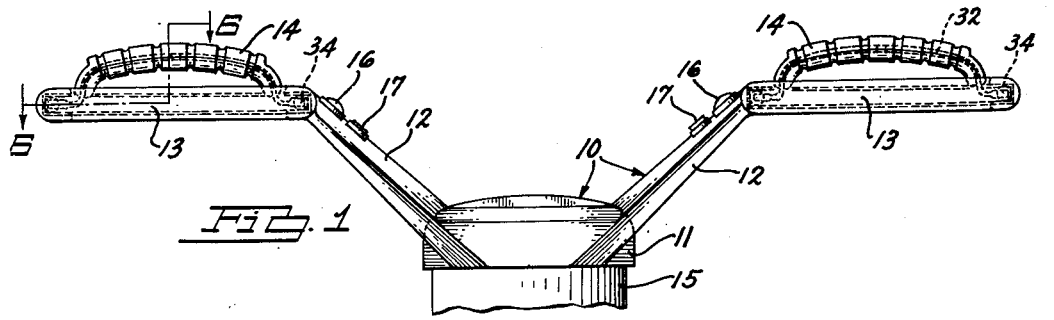
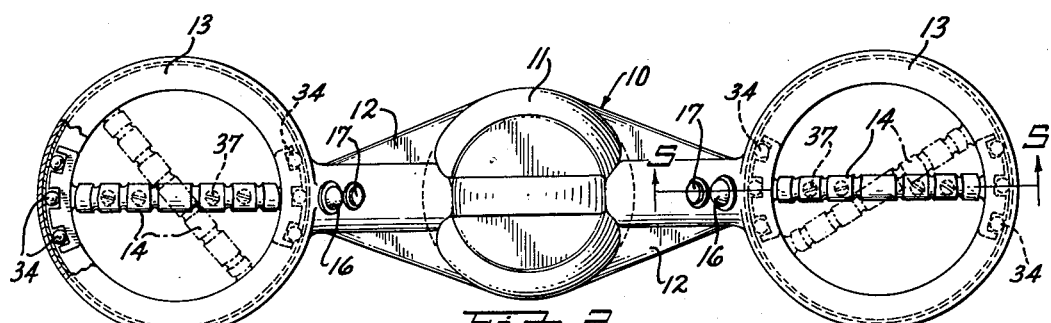
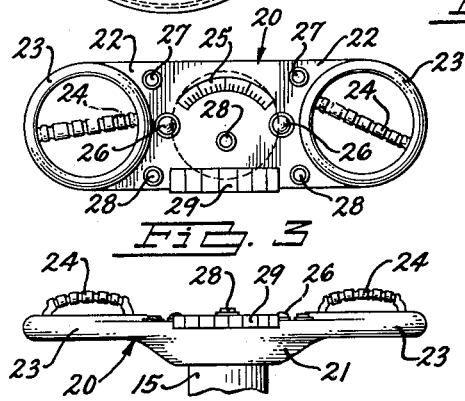
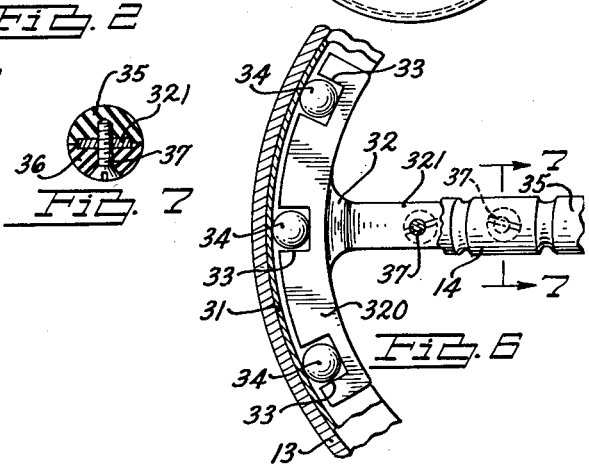
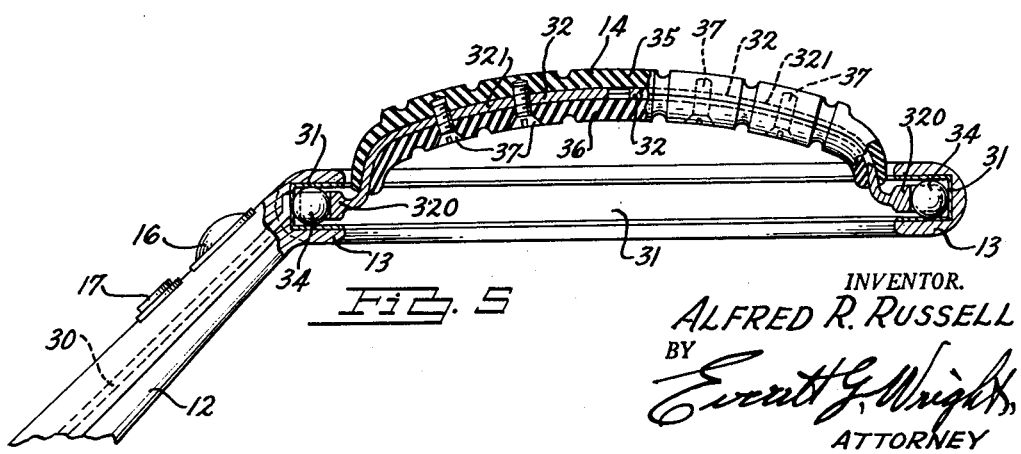
INVENTOR.
ALFRED R. RUSSELL
BY
ATTORNEY United States Patent Office 2,737,060
Patented Mar. 6, 1956

2,737,060

STEERING DEVICES

Alfred R. Russell, St. Clair Shores, Mich.

Application December 28, 1954, Serial No. 478,024

2 Claims. (Cl. 74—552)

This invention relates to improvements in steering devices, and in particular to steering devices of a type that may be substituted for the conventional steering wheel used on modern automotive vehicles.

The primary object of the invention is to provide an improved easy to manipulate steering device for automotive vehicles which, when in its normal position, occupies less space than the convention steering wheel and thus provides relatively easier access to and exit from the driver's seat of the vehicle.

Another object of the invention is to provide a steering device which will not interfere with the vision of drivers of short stature who have difficulty in looking over the top of the conventional steering wheel presently employed.

A further object of the invention is to provide a steering device of the class described which includes free turning hand grip elements having a simplicity of construction and assembly that assures smoothness of operation at all times.

Other objects of the invention will become apparent by reference to the following detailed description taken in connection with the accompanying drawing, in which:

Fig. 1 is an elevational view of a steering device embodying the invention.

Fig. 2 is a plan view of the embodiment of the invention disclosed in Fig. 1.

Figs. 3 and 4 are plan and elevational views respectively of an alternate embodiment of the invention.

Fig. 5 is an enlarged fragmentary view part in section and part in elevation taken on the line 5—5 of Fig. 2.

Fig. 6 is a fragmentary view taken on the line 6—6 of Fig. 1.

Fig. 7 is a cross sectional view taken on the line 7—7 of Fig. 6.

Referring now to the drawing wherein like reference numerals refer to like and corresponding parts throughout the several views, the illustrative embodiment of the invention shown in Figs. 1 and 2 comprises a steering device 10 having a hub 11, transverse arms 12 extending outwardly and upwardly from the hub 11, a hand grip ring 13 fixed on the outer end of each transverse arm 12, and a hand grip 14 turnably mounted in each said hand grip ring. The hub 11 caps the steering column 15 of an automotive vehicle and rotates in respect thereto. Since the hub 11 may be connected in any suitable manner to the steering shaft of the motor vehicle on which the steering device 10 may be employed, and since such construction is not a part of the instant invention, it has not been shown in the drawings and need not be described.

The steering device 20 embodying the invention shown in Figs. 3 and 4 is like and similar to the steering device 10 shown in Figs. 1 and 2 except that the transverse arms 22 and hand grip rings 23 have been combined into a more or less rectangular transversely disposed steering device 20 having hand grips 24 turnably mounted in the hand grip rings 23 therein, the said hand grips 24 being like and similar to the hand grips 14 of the embodiment of the invention shown in Figs. 1 and 2. The hub 21 is positioned below the steering device 20 and overlies the vehicle steering column 15.

In the embodiment of the invention shown in Figs. 1 and 2 a horn button 16 and turn-signal button 17 may be positioned immediately adjacent the hand grip ring 13 for easy thumb operation. In the embodiment of the invention shown in Figs. 3 and 4, a speedometer dial 25, horn buttons 26, turn signal buttons 27, radio control knobs 28 and radio station selector keys 29 are shown mounted in convenient locations on the central portion of steering device 20.

Referring now to Figs. 5, 6 and 7, the transverse arms 12 are preferably provided with a reinforcement member 30 onto which is welded an annular channel shaped ball race 31, the channel thereof facing inwardly of the hand grip ring 13. The hub 11, transverse arms 12 and hand grip ring 13 are preferably molded of plastic with suitable reinforcement members therein including the reinforcement member 30 and the ball race 31.

Each hand grip 14 is formed of a pair of oppositely disposed T-shaped hand grips metal arms 32, each having an arcuate head 320 with outwardly facing ball notches 33 therein to accommodate balls 34. The metal hand grip arms 32 are formed so that when the stems 321 thereof are placed end-to-end, an arch shape is provided. The arcuate heads 320 of a pair of T-shaped hand grip arms 32 are positioned in the ball race 31 with a ball 34 disposed in each ball notch 33. Then top and bottom hand grip elements 35 and 36 are disposed over and under the stems 321 of opposite T-shaped hand grip arms 32, and the assembly is secured together by a plurality of studs 37 extending through the bottom hand grip element 36, through a metal hand grip arm 32, and into the upper hand grip element 35, all as best shown in Figs. 5, 6 and 7. Thus, the hand grips 14 are readily and inexpensively assembled in ball bearing turnable relationship within the hand grip rings 13.

Steering devices embodying the invention have been successfully employed in various automotive vehicles. With the modern steering mechanisms and more particularly when power steering is employed, steering devices embodying the invention meet a long felt need for improved steering mechanisms that are both easy to manipulate and which occupy less usable space opposite the driver's seat in a motor vehicle. In steering the vehicle, the driver may grip either the hand grip rings 13 or the hand grips 14 as he elects, thus providing alternate grips to choose from according to the driver's comfort and desire.

Although but a single embodiment of the invention has been disclosed and described in detail, and only one alternate construction has been disclosed, it is obvious that many changes may be made in the size, shape, detail and arrangement of the various elements of the invention, all without departing from the spirit and scope thereof as defined by the appended claims.

I claim:

1. A steering device of the class described comprising a hub, transverse members extending laterally from said hub terminating in annular hand grip rings at the outer ends thereof, an annular inwardly facing channel shaped ball race formed in the inner periphery of said hand grip rings, a pair of oppositely disposed T-shaped metal arms each having the head thereof curved to conform to the radius of said ball race and having a plurality of ball retainer notches therein, a ball in each of said notches, top and bottom hand grip elements covering the stems of said T-shaped metal arms, and means securing said T-shaped metal arms and said hand grip elements together to form an integral hand grip freely turnably in each said annular hand grip ring.

2. In a steering device of the class described, a generally rectangularly shaped steering arm having hand grip rings at the outer ends thereof, a hub at the center of the said steering arm, a ball race formed in each said hand grip ring, a pair of T-shaped arms having a curved head notched to provide a ball retainer disposed in said ball race, the stems of said T-shaped arms being disposed in alignment, balls in said ball race spaced by said ball retainers, and means splicing said T-shaped arms forming a hand grip.

References Cited in the file of this patent

UNITED STATES PATENTS

| | | |
|---|---|---|
| D. 112,909 | Kathe | Jan. 10, 1939 |
| 1,714,155 | Binkley | May 21, 1929 |
| 2,168,961 | Ragan | Aug. 8, 1939 |